US008970121B2

(12) United States Patent
Suzuki

(10) Patent No.: US 8,970,121 B2
(45) Date of Patent: Mar. 3, 2015

(54) DRIVING DEVICE, LIGHT-EMITTING DEVICE AND PROJECTOR

(71) Applicant: Casio Computer Co., Ltd., Tokyo (JP)

(72) Inventor: Hideo Suzuki, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/794,704

(22) Filed: Mar. 11, 2013

(65) Prior Publication Data

US 2013/0241438 A1 Sep. 19, 2013

(30) Foreign Application Priority Data

Mar. 13, 2012 (JP) ................................ 2012-055371

(51) Int. Cl.
*H05B 37/02* (2006.01)
*H02J 1/00* (2006.01)
*H05B 33/08* (2006.01)

(52) U.S. Cl.
CPC . *H02J 1/00* (2013.01); *H05B 37/02* (2013.01); *H05B 33/0803* (2013.01); *H05B 33/0815* (2013.01)
USPC ........ 315/210; 315/224; 315/227 R; 315/291; 315/299

(58) Field of Classification Search
USPC .......... 315/209 R, 210, 224, 225, 226, 227 R, 315/291, 299
See application file for complete search history.

(56) References Cited

U.S. PATENT DOCUMENTS

| | | | | |
|---|---|---|---|---|
| 7,312,783 | B2 * | 12/2007 | Oyama | 345/102 |
| 7,508,143 | B2 | 3/2009 | Suzuki | |
| 8,536,797 | B2 * | 9/2013 | Suzuki | 315/291 |
| 2004/0196225 | A1 | 10/2004 | Shimada | |

FOREIGN PATENT DOCUMENTS

| | | | |
|---|---|---|---|
| JP | 2004-311635 | A | 11/2004 |
| JP | 2007-273666 | A | 10/2007 |

* cited by examiner

*Primary Examiner* — Thuy Vinh Tran

(74) *Attorney, Agent, or Firm* — Holtz, Holtz, Goodman & Chick PC

(57) ABSTRACT

A driving device includes a power source that converts input power to output power, first and second capacitors connected to an output of the power source, a load selector, and a capacitor selector. The load selector opens/closes circuits of first and second loads connected to the output of the power source to alternately close these circuits such that the second-load circuit is closed after the opening of the first-load circuit. The capacitor selector opens/closes circuits of the first and second capacitors to alternately close these circuits such that the first-capacitor circuit is closed in synchronization with the closing of the first-load circuit, and such that the second-capacitor circuit is closed in synchronization with the closing of the second-load circuit. The capacitor selector opens the first-capacitor circuit after the opening of the first-load circuit.

16 Claims, 6 Drawing Sheets

DRIVING DEVICE, LIGHT-EMITTING DEVICE AND PROJECTOR

BACKGROUND OF THE INVENTION

1. Field of the Invention

The present invention relates to a driving device, a light-emitting device and a projector.

2. Description of Related Art

For example, a switching regulator (switching power source or DC-DC converter), serving as a power source, is a circuit that converts a DC input voltage to a DC output voltage through a turning on/off operation of a switching element and is used as a power source or driver having various loads. The output current or voltage from the switching regulator is controlled by a feedback control system so as to be maintained at a constant target value.

Electric power can be supplied in sequence from a single switching regulator to a plurality of loads through sequential selection of the loads with a selector installed at the output of the switching regulator (for example, refer to FIG. 25 in Japanese Patent Application Laid-Open No. 2004-311635).

If different currents are supplied to individual loads, the output current of a switching regulator having a variable target value is switched for each load in synchronization with the selection of the load.

When a light-out period, during which no load is selected, is provided between a load-selected period and the next load-selected period, the circuit for the output of the switching regulator (i.e., a power source) is opened. Accordingly, during the light-out period, energy accumulated in a circuit element, such as an inductor, inside the switching regulator is not absorbed, leading to an increase in the output voltage from the switching regulator. Such a phenomenon results in a delay in the response of the output voltage and/or the output current from the switching regulator in the subsequent load-selected period. This extends the period of time required for the output voltage and/or the output current to reach a target value.

SUMMARY OF THE INVENTION

An object of the present invention is to prevent a delay in the response of an output current and/or voltage from a power source in a load-selected period subsequent to a light-out period.

According to a first aspect of the present invention, there is provided a driving device including: a power source that converts input power to output power; a first capacitor connected to an output of the power source; a second capacitor connected to the output of the power source; a load selector that opens and closes a circuit of a first load connected to the output of the power source and a circuit of a second load, connected to the output of the power source so as to alternately close the circuit of the first load and the circuit of the second load such that the load selector closes the circuit of the second load after the opening of the circuit of the first load; and a capacitor selector that opens and closes a circuit of the first capacitor and a circuit of the second capacitor so as to alternately close the circuit of the first capacitor and the circuit of the second capacitor such that the capacitor selector closes the circuit of the first capacitor in synchronization with the closing of the circuit of the first load by the load selector, and such that the capacitor selector closes the circuit of the second capacitor in synchronization with the closing of the circuit of the second load by the load selector, wherein the capacitor selector opens the circuit of the first capacitor after the opening of the circuit of the first load by the load selector.

According to a second aspect of the present invention, there is provided a light-emitting device including: a power source that converts input power to output power; a first capacitor connected to an output of the power source; a second capacitor connected to the output of the power source; a first light-emitting element connected to the output of the power source; a second light-emitting element connected to the output of the power source; a light-emitting-element selector that opens and closes a circuit of the first light-emitting element and a circuit of the second light-emitting element so as to alternately open the circuit of the first light-emitting element and the circuit of the second light-emitting element such that the light-emitting-element selector opens the circuit of the second light-emitting element after the closing of the circuit of the first light-emitting element; and a capacitor selector that opens and closes a circuit of the first capacitor and a circuit of the second capacitor so as to alternately close the circuit of the first capacitor and the circuit of the second capacitor such that the capacitor selector closes the circuit of the first capacitor in synchronization with the closing of the circuit of the first light-emitting element by the light-emitting-element selector, and such that the capacitor selector closes the circuit of the second capacitor in synchronization with the closing of the circuit of the second light-emitting element by the light-emitting-element selector, wherein the capacitor selector opens the circuit of the first capacitor after the opening of the circuit of the first light-emitting element by the light-emitting-element selector.

BRIEF DESCRIPTION OF THE DRAWINGS

The above and other objects, advantages and features of the present invention will become more fully understood from the detailed description given herein below and the appended drawings which are given by way of illustration only, and thus are not intended as a definition of the limits of the present invention, and wherein.

DESCRIPTION OF THE PREFERRED EMBODIMENTS

Embodiments of the present invention will now be described with reference to the accompanying drawings. Although the embodiments include various preferable features to achieve the present invention, the present invention should not be limited to the preferred embodiments and drawings described below.

[First Embodiment]

Figure 1:
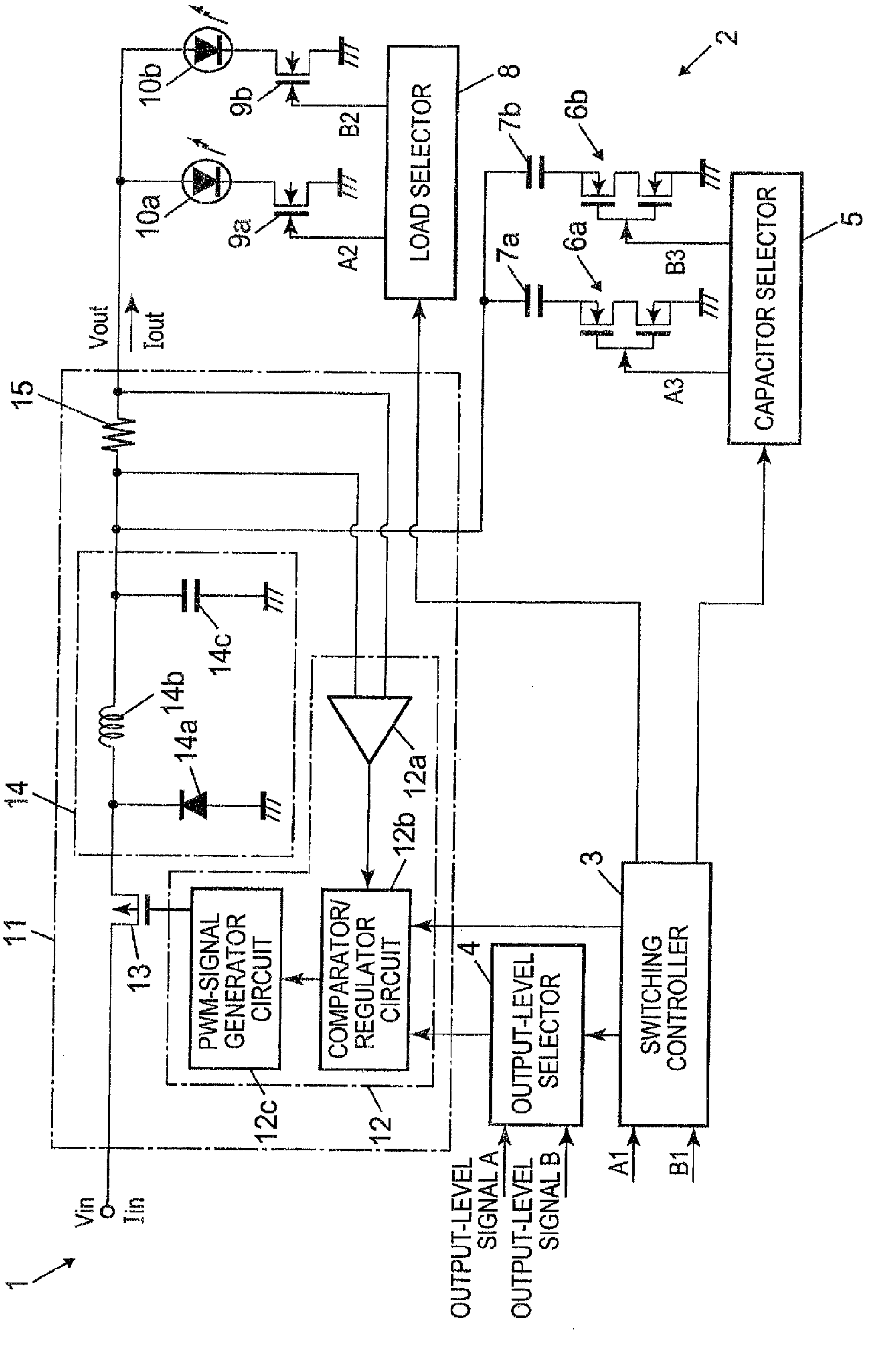
FIG. 1 is a circuit diagram of a sequential color light-emitting device according to a first embodiment.
Figure 2:
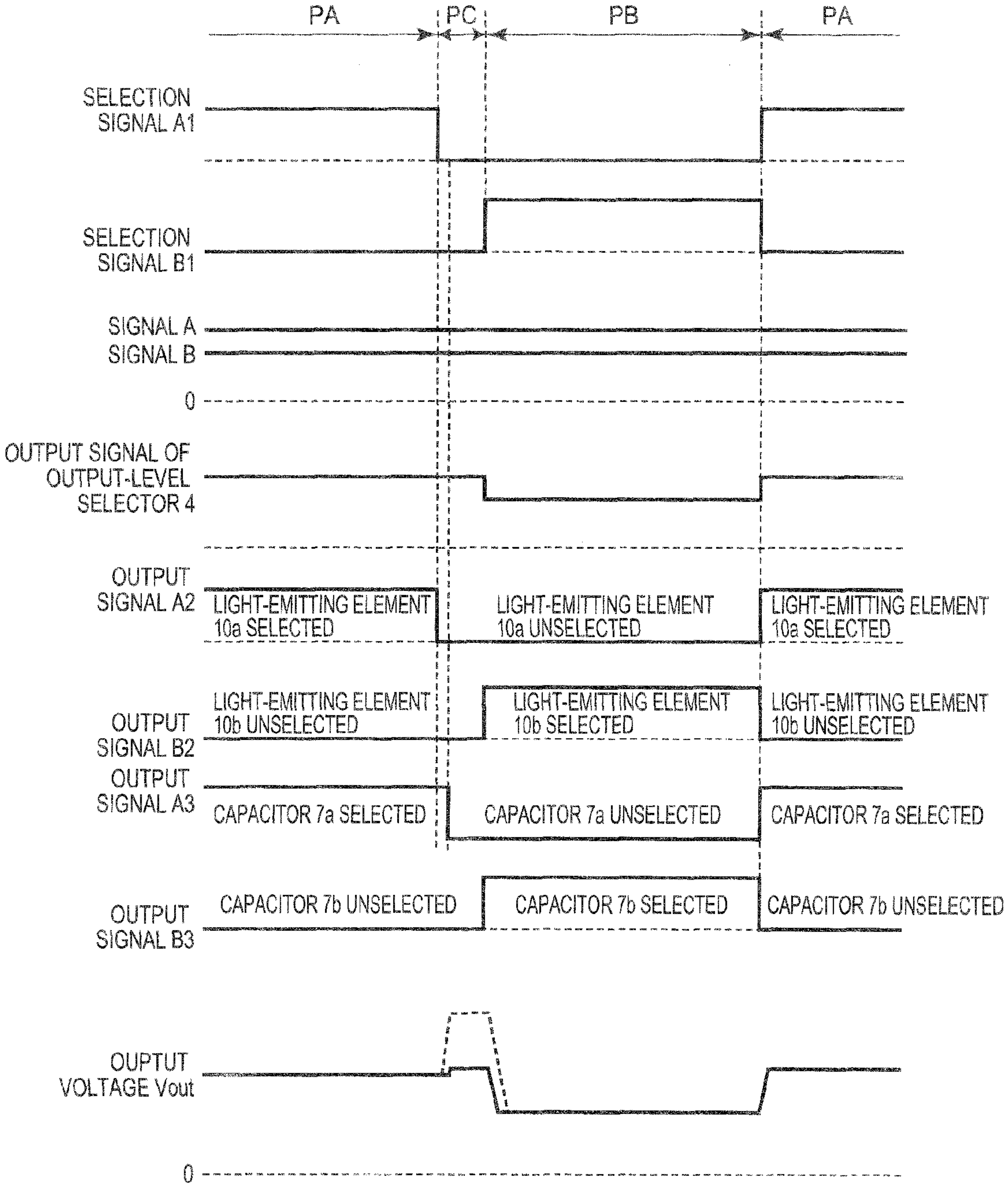
FIG. 2 is a timing chart illustrating signal waveforms of the individual components of the sequential color light-emitting device.

FIG. 1 is a circuit diagram of a sequential color light-emitting device 1. FIG. 2 is a timing chart illustrating the signal waveforms of the individual components included in the sequential color light-emitting device 1.

The sequential color light-emitting device 1 includes light-emitting elements 10*a* and 10*b*, a switching controller 3, an output-level selector 4, a capacitor selector 5, switches 6*a* and 6*b*, capacitors 7*a* and 7*b*, a load selector (light-emitting-element selector) 8, semiconductor switching elements 9*a* and 9*b*, and a switching regulator 11 serving as a power source (power circuit or power converter).

A driving device 2 is a circuit including the switching controller 3, the output-level selector 4, the capacitor selector 5, the switches 6*a* and 6*b*, the capacitors 7*a* and 7*b*, the load selector 8, the semiconductor switching elements 9*a* and 9*b*, and the switching regulator (DC-DC converter) 11. The driving device 2 is applied to the sequential color light-emitting device 1 to drive the light-emitting elements 10*a* and 10*b*. Specifically, the driving device 2 alternately turns on the light-emitting elements 10*a* and 10*b*. The emission period (PA) during which the first light-emitting element 10*a* is in an ON state is followed by a light-out period (PC) during which both light-emitting elements 10*a* and 10*b* are in an OFF state, which is then followed by another emission period (PB) during which the second light-emitting element 10*b* is in an ON state. (PA, PB and PC are described below.)

The flashing cycle of the light-emitting element 10*a* and the flashing cycle of the light-emitting element 10*b* are short; the flashing rate of the light-emitting elements 10*a* and 10*b* is too high to be sensed by the naked eye. The light-emitting elements 10*a* and 10*b* are examples of loads. The driving device 2 may be used to alternately turn on a first load and a second load, other than the light-emitting elements 10*a* and 10*b*.

The light-emitting elements 10*a* and 10*b* may be light-emitting diodes, organic EL elements, semiconductor laser elements, or other semiconductor light-emitting elements. When the light-emitting elements 10*a* and 10*b* emit light at different target intensities, they have different voltages and currents. Also, the light-emitting elements 10*a* and 10*b* have different rated voltages and rated currents.

The light-emitting elements 10*a* and 10*b* emit light of different colors. For example, the first light-emitting element 10*a* emits red light, and the second light-emitting element 10*b* emits blue light. The wavelength bands of the light emitted from the light-emitting elements 10*a* and 10*b* are not limited to the visible light range.

The following description shows a case where the light-emitting elements 10*a* and 10*b* emit light of different colors. The present invention should however not be limited to such a case.

The light-emitting elements 10*a* and 10*b* are connected in parallel between the output of the switching regulator 11 and the ground. The anodes of the light-emitting elements 10*a* and 10*b* are connected to the output of the switching regulator 11, while the cathodes of the light-emitting elements 10*a* and 10*b* are grounded via the semiconductor switching elements 9*a* and 9*b*, respectively.

The semiconductor switching element 9*a* opens/closes the circuit of the first light-emitting element 10*a*. The semiconductor switching element 9*a* is an N channel field-effect transistor. The drain of the semiconductor switching element 9*a* is connected to the cathode of the first light-emitting element 10*a*, while the source is grounded. The gate of the semiconductor switching element 9*a* is connected to the load selector 8. The semiconductor switching element 9*a* may be disposed between the output of the switching regulator 11 and the first light-emitting element 10*a*.

Similarly, the semiconductor switching element 9*b* opens/closes the circuit of the second light-emitting element 10*b*. The semiconductor switching element 9*b* is an N-channel field-effect transistor. The drain of the semiconductor switching element 9*b* is connected to the cathode of the second light-emitting element 10*b*, and the source is grounded. The gate of the semiconductor switching element 9*b* is connected to the load selector 8. The semiconductor switching element 9*b* may be disposed between the output of the switching regulator 11 and the second light-emitting element 10*b*.

The semiconductor switching elements 9*a* and 9*b* are turned on/off by the load selector 8. The load selector 8 is controlled by the switching controller 3. As illustrated in FIG. 2, the switching controller 3 receives a selection signal A1 and a selection signal B1. The selection signals A1 and B1 have the same cycle and alternately reach an ON level because the ON level (high level) period of the selection signal A1 and the ON level (high level) period of the selection signal B1 do not overlap with each other. The rising edge of the selection signal A1 synchronizes with the falling edge of the selection signal B1. After the falling of the selection signal A1, the selection signal B1 rises.

The switching controller 3 controls the load selector 8 by sending signals in synchronization with the selection signals A1 and B1 to the load selector 8. In response to the signals from the switching controller 3, the load selector 8 sends an output signal A2 in synchronization with the selection signal A1 to the gate of the semiconductor switching element 9*a*, and sends an output signal B2 in synchronization with the selection signal B1 to the gate of the semiconductor switching element 9*b*.

The load selector 8 alternately turns on the semiconductor switching elements 9*a* and 9*b*. As a result, the circuits of the light-emitting elements 10*a* and 10*b* are alternately closed by the load selector 8. Referring to FIG. 2, selecting the first light-emitting element 10*a* is to close (connect) the circuit of the first light-emitting element 10*a*, and unselecting the first light-emitting element 10*a* is to open (break) the circuit of the first light-emitting element 10*a*. The same applies to selecting and unselecting of the second light-emitting element 10*b*.

The load selector 8 alternately turns on the semiconductor switching elements 9*a* and 9*b*, such that the semiconductor switching element 9*b* is turned on after turning off the semiconductor switching element. 9*a* whereas the semiconductor switching element 9*a* is turned on and the semiconductor switching element 9*b* is turned off at the same time. The period during which the semiconductor switching element 9*a* is in an ON state is referred to as an emission period PA, the period during which the semiconductor switching element 9*b* is in an ON state is referred to as an emission period PB, and the period during which the semiconductor switching elements 9*a* and 9*b* are both in an OFF state is referred to as a light-out period PC. The lengths of the periods PA, PB and PC may be different or the same. Alternatively, two of the periods PA, PB and PC may have the same length, while the other may have a different length.

In the emission period PA, the semiconductor switching element 9*a* is in an ON state so that the circuit of the first light-emitting element 10*a* is closed, and the semiconductor switching element 9*b* is in an OFF state so that the circuit of the second light-emitting element 10*b* is opened. So, in the emission period PA, a current flows through the first light-emitting element 10*a* but does not flow through the second light-emitting element 10*b*. In the light-out period PC, the semiconductor switching elements 9*a* and 9*b* are both in an OFF state so that both the circuits of the light-emitting elements 10*a* and 10*b* are opened. In the emission period PB, the semiconductor switching element 9*a* is in an OFF state so that the circuit of the first light-emitting element 10*a* is opened, while the semiconductor switching element 9*b* is in an ON state so that the circuit of the second light-emitting element 10*b* is closed.

The switching regulator 11 converts the input power into output power to generate the output power from the input power. That is, a DC input voltage Vin is converted to a DC output voltage Vout, and a DC input current Iin is converted to a DC output current Iout through the on/off operation of a switching element 13 of the switching regulator 11. The switching regulator 11 includes the switching element 13, a smoothing circuit 14, a resistor 15 and a controller 12.

The switching element 13 is a P-channel or N-channel field-effect transistor. Depending on the type of the switching element 13, one of the source electrode and the drain electrode of the switching element 13 is connected to the power source of the input voltage Vin, while the other of the source electrode and the drain electrode is connected to the smoothing circuit 14. The input voltage Vin is chopped as a result of the on/off operation of the switching element 13. The output of the switching element 13 is then sent to the smoothing circuit 14 to be smoothened. Then, the resultant is outputted as the output voltage Vout of the switching regulator 11.

The smoothing circuit 14 includes a free wheel diode 14*a*, an inductor 14*b* and a capacitor 14*c*. The anode of the free wheel diode 14*a* is grounded, while the cathode of the free wheel diode 14*a* is connected to the other one of the source electrode and the drain electrode of the switching element 13. One end of the inductor 14*b* is connected to the other one of the source electrode and the drain electrode of the switching element 13 and the cathode of the free wheel diode 14*a*, while the other end of the inductor 14*b* is connected to the anodes of the light-emitting elements 10*a* and 10*b* via the resistor 15. One electrode of the capacitor 14*c* is connected to the inductor 14*b* and the resistor 15 between the inductor 14*b* and the resistor 15, while the other electrode of the capacitor 14*c* is grounded.

The gate of the switching element 13 is connected to the controller 12, and the switching element 13 is turned on/off in response to the output signal (PWM signal) of the controller 12. The cycle of the output signal from the controller 12 is shorter than the cycles of the output signals A2 and B2 from the load selector 8. Thus, the on/off operation of the switching element 13 is faster than that of the semiconductor switching elements 9*a* and 9*b*.

When the switching element 13 is turned on, the energy is accumulated into the inductor 14*b* due to the current flowing from the input (power source of the input voltage Vin) through the switching element 13, the inductor 14*b* and the resistor 15 to the output of the switching regulator 11. When the switching element 13 is then turned off, the inductor 14*b* generates an induced electromotive force to allow a current to flow through the free wheel diode 14*a*, and a current flows from the ground through the free wheel diode 14*a*, the inductor 14*b* and the resistor 15 to the output of the switching regulator 11. Thus, the energy accumulated in the inductor 14*b* is released. As a result, the input voltage Vin is converted to the output voltage Vout. Ripples in the output voltage Vout are reduced by the charge/discharge of the capacitor 14*c* at the on/off operation of the switching element 13.

The resistor 15 converts the output current lout of the switching regulator 11 flowing through the resistor 15 to a voltage. That is, the current flowing through the resistor 15 is converted to a voltage difference between both ends of the resistor 15 and is fed back to the controller 12, and thereby the output current Iout is fed back to the controller 12. The controller 12 performs feedback control for the output current Iout. Specifically, the controller 12 generates a PWM signal with a duty cycle based on the fed-back output current lout and a target value (which is specifically an output-level signal A or B, as described below), and sends the PWM signal to the gate of the switching element 13. As a result, the controller 12 performs constant current control where the output current Tout is controlled to be brought close to the target value and to be maintained at it.

The controller 12 includes a differential amplifier 12*a*, a comparator/regulator circuit 12*b* and a PWM-signal generator circuit 12*c*. The differential amplifier 12*a* detects the output current Iout. That is, the differential amplifier 12*a* receives voltages at both ends of the resistor 15 and outputs the difference of the voltages to the comparator/regulator circuit 12*b*. The comparator/regulator circuit 12*b* compares the output of the differential amplifier 12*a* with the target value (which is specifically an output-level signal A or B, as described below), and performs the feedback control to reduce the difference between the output of the differential amplifier 12*a* and the target value. The PWM-signal generator circuit 12*c* generates a PWM signal with a duty cycle corresponding to the regulated output from the comparator/regulator circuit 12*b*, and sends the PWM signal to the gate of the switching element 13.

The switching regulator 11 is of a type having a variable target value. The output current Iout of the switching regulator 11 during the emission period PA differs from the output current Iout of the switching regulator 11 during the emission period PB. Specifically, the switching regulator 11 controls the output current Iout by changing the target value on the basis of output signals from the switching controller 3 and the output-level selector 4.

The following description shows a case where the output current Iout from the switching regulator 11 differs between the emission periods PA and PB. But, switching with capacitor selection is effective as long as loads of different voltages are applied. For example, if light-emitting elements, such as LEDs, having different characteristics depending on the color of the emitted light are driven with the same target current, the present invention is effective because the voltages differ greatly due to the characteristics of the elements. (In such a case, the output-level signals A and B are the same but the output voltages differ, leading to different operations of the feedback control system.)

The change in the target value will now be described in detail. The switching controller 3 outputs a signal in synchronization with the selection signal A1 and another signal in synchronization with the selection signal B1 to the output-level selector 4. The output-level selector 4 receives output-level signals A and B having constant levels. In this embodiment, the levels of the output-level signals A and B differ from each other, and the level of the output-level signal A is higher than the level of the output-level signal B. The output-level signal A corresponds to the current (load current) of the first light-emitting element 10*a* for the first light-emitting element 10*a* to emit light at a target intensity, and the output-level signal B corresponds to the current (load current) of the second light-emitting element 10*b* for the second light-emitting element 10*b* to emit light at a target intensity. The level of the output-level signal A may be lower than the level of the output-level signal B.

The output-level selector 4 selects one of the output-level signals A and B on the basis of the output signal from the switching controller 3, and sends the selected signal to the comparator/regulator circuit 12*b* of the controller 12 as a target value. In short, after the selection signal A1 reaches an ON level (high level), the output-level selector 4 continues to select the output-level signal A and to output the output-level signal A to the comparator/regulator circuit 12*b* until the selection signal B1 reaches an ON level. In contrast, after the selection signal B1 reaches an ON level, the output-level selector 4 continues to select the output-level signal B and output the output-level signal B to the comparator/regulator circuit 12*b* until the selection signal A1 reaches an ON level. Thus, the level of the output signal from the output-level selector 4 equals the level of the output-level signal A during the emission periods PA and the light-out periods PC, while the level of the output signal from the output-level selector 4 equals the level of the output-level signal B during the emission periods PB.

The switching controller 3 calculates the logical sum of the selection signals A1 and B1, and sends the logical sum as an output signal to the comparator/regulator circuit 12*b* of the controller 12. Thus, a signal at an ON level is sent from the switching controller 3 to the comparator/regulator circuit 12*b* during the emission periods PA and PB during which the selection signal A1 or B1 is at an ON level, while a signal at an OFF level is sent from the switching controller 3 to the comparator/regulator circuit 12*b* during the light-out period PC during which the selection signals A1 and B1 both are at an OFF level.

The switching controller 3 controls the on/off operation of the comparator/regulator circuit 12*b*. That is, the comparator/regulator circuit 12*b* operates during the emission periods PA and PB during which the signal sent from the switching controller 3 to the comparator/regulator circuit 12*b* is at an ON level, whereas the comparator/regulator circuit 12*b* stops the operation during the light-out period PC during which the signal sent from the switching controller 3 to the comparator/regulator circuit 12*b* is at an OFF level.

Thus, during the emission period PA, the target value reaches the level of the output-level signal A, and the output current Iout of the switching regulator 11 comes close to the target value. During the light-out period PC, the comparator/regulator circuit 12*b* stops operation, causing the output current Iout of the switching regulator 11 to drop to zero. During the emission period PB, the target value reaches the level of the output-level signal B, and the output current Iout of the switching regulator 11 comes close to the target value.

Figure 3:
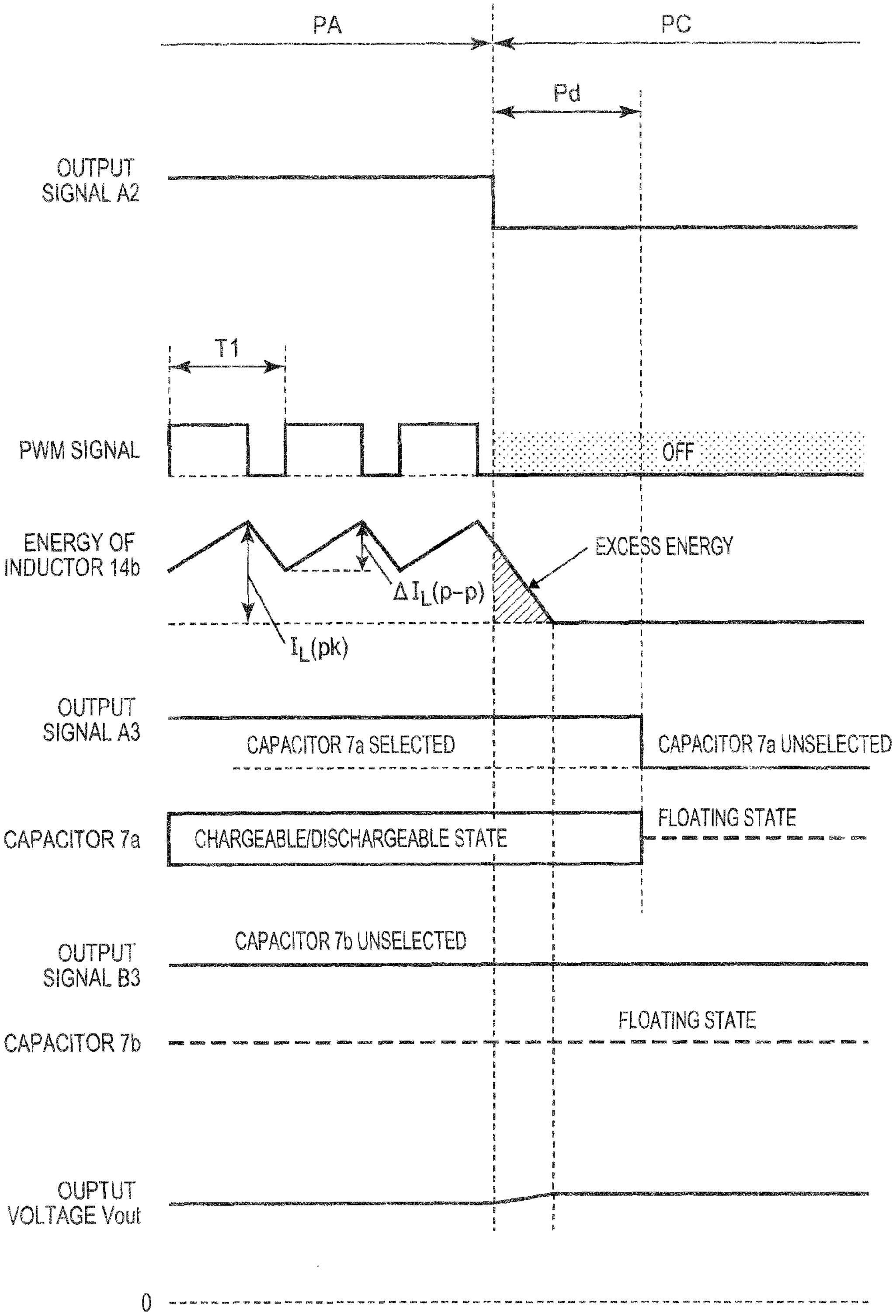
FIG. 3 is an enlarged view of the timing chart in FIG. 2.

FIG. 3 is a timing chart illustrating the signal waveforms of the individual components included in the sequential color light-emitting device 1 from an emission period PA to a subsequent light-out period PC. As illustrated in FIG. 3, the cycles of the PWM signal and the selection signal A1 and the ON duty cycle of the selection signal A1 are set, such that the selection signal A1, which is illustrated in FIG. 2, falls from the ON level to the OFF level when the PWM signal from the PWM-signal generator circuit 12*c* is at an OFF level.

The present invention, however, is not limited to a case in which the selection signal A1, which is illustrated in FIG. 2, falls from the ON level to the OFF level, when the PWM signal from the PWM-signal generator circuit 12*c* is at an OFF level. The selection signal A1 may drop to an OFF level at any timing of the PWM signal. The PWM signal is forced to an OFF level, when the selection signals A1 and B1 both drop to the OFF level.

The capacitors 7*a* and 7*b* are connected to the output of the switching regulator 11. Specifically, the capacitors 7*a* and 7*b* and the capacitor 14*c* are connected in parallel; the first terminals of the capacitors 7*a* and 7*b* are connected to a first terminal of the capacitor 14*c* between the inductor 14*b* and the resistor 15; and the second terminals of the capacitors 7*a* and 7*b* are grounded via the switches 6*a* and 6*b*, respectively. The capacities of the capacitors 7*a* and 7*b* are larger than the capacity of the capacitor 14*c*.

The switch 6*a* opens/closes the circuit of the first capacitor 7*a*. The switch 6*a* includes two field-effect transistors of the same channel type, that is, two N-channel field-effect transistors in this embodiment. The source of a first field-effect transistor of the switch 6*a* is connected to the first capacitor 7*a*. The drain of the first field-effect transistor is connected to the drain of a second field-effect transistor of the switch 6*a*. The source of the second field-effect transistor is grounded.

The switch 6*b* opens/closes the circuit of the second capacitor 7*b*. The configuration of the switch 6*b* is the same as that of the switch 6*a*.

The capacitor selector 5 sends output signals A3 and B3 having a constant cycle, as shown in FIG. 2, to the gates of the switches 6*a* and 6*b*, respectively, to turn on/off the switches 6*a* and 6*b*. The output signals A3 and B3 have the same cycle, but the period during which the output signal A3 is at an ON level (high level) is shifted from the period during which the output signal B3 is at an ON level (high level). Accordingly, the capacitor selector 5 alternately turns on the switches 6*a* and 6*b*. In this way, the circuits of the capacitors 7*a* and 7*b* are alternately closed by the capacitor selector 5. In this embodiment, selecting the first capacitor 7*a* is to close (connect) the circuit of the first capacitor 7*a*, and unselecting the first capacitor 7*a* is to open (break) the circuit of the first capacitor 7*a*. The same applies to selecting and unselecting of the second capacitor 7*h*.

The switching controller 3 sends a signal in synchronization with the selection signals A1 and B1 to the capacitor selector 5 to control the capacitor selector 5. The capacitor selector 5 sends the output signal B3 in synchronization with the selection signal B1 and the output signal B2 to the gate of the switch 6*b* on the basis of the signal from the switching controller 3. The capacitor selector 5 synchronizes the opening/closing of the circuit of the second capacitor 7*b* with the opening/closing of the circuit of the second light-emitting element 10*b*. The falling edge of the output signal B3 is in synchronization with the rising edges of the selection signal A1 and the output signal A2. The rising edge of the output signal B3 is delayed from the falling edges of the selection signal A1 and the output signal A2.

The capacitor selector 5 sends the output signal A3 to the gate of the switch 6*a* on the basis of the signal from the switching controller 3. Specifically, the capacitor selector 5 synchronizes the rising edge of the output signal A3 with the falling edge of the output signal B3, and the rising edge of the output signal B3 is delayed from the falling edge of the output signal A3. Thus, the capacitor selector 5 alternately closes the circuits of the capacitors 7*a* and 7*b* by closing the circuit of the second capacitor 7*b* after opening the circuit of the first capacitor 7*a*, and by closing the circuit of the first capacitor 7*a* in synchronization with the opening of the circuit of the second capacitor 7*b*.

The capacitor selector 5 synchronizes the rising edge of the output signal A3 with the rising edges of the selection signal A1 and the output signal A2. That is, the capacitor selector 5 closes the circuit of the capacitor 7*a* in synchronization with the closing of the circuit of the light-emitting element 10*a*. The capacitor selector 5 delays the falling edge of the output signal A3 from the falling edges of the selection signal A1 and the output signal A2. That is, during the light-out period PC, the capacitor selector 5 opens the circuit of the first capacitor 7*a* after opening the circuit of the first light-emitting element 10*a*.

As illustrated in FIG. 3, the delay period Pd from the opening of the circuit of the first light-emitting element 10*a* (falling edge of the output signal A2) to the opening of the circuit of the first capacitor 7*a* (falling edge of the output signal A3) is preferably longer than the PWM cycle T1 of the PWM-signal generator circuit 12*c*. The timing of opening the circuit of the first capacitor 7*a* is preferably at or after the end of the last cycle of the PWM signal of the emission period PA.

Details of the operation will now be described.

The load selector 8 simultaneously turns on the semiconductor switching element 9*a* and turns off the semiconductor switching element 9*b* at the beginning of an emission period PA. At the same time, the capacitor selector 5 turns on the switch 6*a* and turns off the switch 6*b*. Such switching operations close the circuits of the first light-emitting element 10*a* and the first capacitor 7*a*, and open the circuits of the second light-emitting element 10*b* and the second capacitor 7*b*.

At the beginning of the emission period PA, the level of the signal sent from the output-level selector 4 to the controller 12 is switched from the level of the output-level signal B to the level of the output-level signal A, so that the level of the output current lout is switched to a level corresponding to the output-level signal A. During the emission period PA, the controller 12 performs feedback control where the output current lout is controlled to be brought close to the target value and to be maintained at it corresponding to the level of the output-level signal A. In this way, the constant output current lout is supplied to the first light-emitting element 10*a*. In response, the first light-emitting element 10*a* emits light while the output voltage Vout is maintained at a constant level (actually, slight ripples occur in the output current lout and the output voltage Vout). During this procedure, the closed circuit of the first capacitor 7*a* allows the first capacitor 7*a* to receive a charge corresponding to the voltage of the first light-emitting element 10*a*, and allows the voltage of the first light-emitting element 10*a* to be stored in the first capacitor 7*a* as a potential difference between both terminals of the first capacitor 7*a*. During the emission period PA, the circuits of the second light-emitting element 10*b* and the second capacitor 7*b* are opened; thus, the second light-emitting element 10*b* does not emit light, and the second capacitor 7*b* is in a floating state.

At the beginning of the subsequent light-out period PC, the load selector 8 turns off the semiconductor switching element 9*a* to open the circuit of the first light-emitting element 10*a*. This operation turns off the first light-emitting element 10*a*. The controller 12 (in particular, the comparator/regulator circuit 12*b*) is stopped in synchronization with the opening of the circuit of the first light-emitting element 10*a*, stopping the on/off operation of the switching controller 13. At this time, the excess energy accumulated in the inductor 14*b* (see FIG. 3) is released to be charged or absorbed into the first capacitor 7*a*. Thus, the output voltage Vout from the switching regulator 11 immediately after the emission period PA (i.e., immediately after turning off the semiconductor switching element 9*a*) slightly increases and does not suddenly or significantly increase. If the opening of the circuit of the first capacitor 7*a* is in synchronization with the opening of the circuit of the first light-emitting element 10*a*, the output voltage Vout would increase as illustrated in FIG. 2 with a dotted line. This embodiment can suppress such an increase. In particular, the delay period Pd sufficiently longer than the PWM cycle T1, as illustrated in FIG. 3, sufficiently absorbs the excess energy accumulated in the inductor 14*b*, preventing an increase in the output voltage Vout.

The length of the delay period Pd being sufficiently longer than the PWM cycle T1 means that the length of the delay period Pd is larger than or equal to C×T1, where C is the required number of cycles.

The required number of cycles C is determined by the following equation:

$$C=IL(pk)/\Delta IL(p-p)$$

where IL(pk) is the peak current of the inductor, and ΔIL(p−p) is the peak-to-peak of the ripple current of the inductor.

IL(pk) and ΔIL(p−p) can be determined through design calculation or experiment.

The capacitor selector 5 then turns off the switch 6*a* to open the circuit of the first capacitor 7*a*, which enters a floating state. This operation maintains the charge of the first capacitor 7*a* and stores the potential difference between the terminals of the first capacitor 7*a* in the first capacitor 7*a*.

At the beginning of the subsequent emission period PB, the load selector 8 turns on the semiconductor switching element 9*b*, and at the same time, the capacitor selector 5 turns on the switch 6*b*. This operation closes the circuits of the second light-emitting element 10*b* and the second capacitor 7*b*.

At the beginning of the emission period PB, the operation of the controller 12 (the comparator/regulator circuit 12*b* in particular) starts in synchronization with the closing of the circuits of the second light-emitting element 10*b* and the second capacitor 7*b*, which starts control of the on/off operation of the switching element 13. At this time, the level of the signal sent from the output-level selector 4 to the controller 12 switches from the level of the output-level signal A to the level of the output-level signal B, causing the level of the output current Iout to switch to a level corresponding to the output-level signal B. During the emission period PB, the controller 12 performs feedback control where the output current Iout is controlled to be brought close to a target value and to be maintained at it corresponding to the level of the output-level signal B. In this way, the constant output current lout is supplied to the second light-emitting element 10*b* to emit light while the output voltage Vout is maintained at constant level. During this procedure, the closed circuit of the second capacitor 7*b* allows the second capacitor 7*b* to receive a charge corresponding to the voltage of the second light-emitting element 10*b*, and allows the voltage of the second light-emitting element 10*b* to be stored in the second capacitor 7*b* as a potential difference between both terminals of the second capacitor 7*b*.

The series of operations described above are repeated.

The second capacitor 7*b* is charged during the emission period PB, whereas the circuit of the second capacitor 7*b* is opened during the subsequent emission period PA. Therefore, the voltage between the terminals of the second capacitor 7*b* during the emission period PB is maintained even through the emission period PA. And, the circuit of the second capacitor 7*b* is closed at the beginning of the subsequent emission period PE. Accordingly, immediately after the beginning of the emission period PB, the output voltage Vout reaches a voltage appropriate for light emission of the second light-emitting element 10*b*, and then enters a steady state. In the same way, immediately after the beginning of the emission period PA, the output voltage Vout reaches a voltage appropriate for light emission of the first light-emitting element 10*a* owing to the holding or storage ability of the first capacitor 7*a*, and then enters a steady state. Hence, high-speed switching can be achieved among the emission period PA, the light-out period. PC, and the emission period 2B.

The first capacitor 7*a* prevents the increase in the output voltage Vout during the light-out period PC, decreasing the capacity of the capacitor 14*c*. The small capacity of the capacitor 14*c* does not disturb the storage ability of the first capacitor 7*a* during the emission period PA and the storage ability of the second capacitor 7*b* during the emission period PB. Thus, high-speed switching can be achieved among the emission period PA, the light-out period PC, and the emission period PE.

The increase in the output voltage Vout during the light-out period PC is prevented by the first capacitor 7*a*. Thus, immediately after the beginning of the subsequent emission period PB, a delay in the response of the output voltage Vout and the output current Iout does not occur, and the output voltage Vout and the output current Tout immediately reach values appropriate for light emission of the second light-emitting element 10*b*. Hence, high-speed switching can be achieved among the emission period PA, the light-out period PC, and the emission period PB.

[First Modification]

In the embodiment described above, the switching regulator 11 is of a buck type. Alternatively, the switching regulator 11 may be of a boost type or a buck-boost type. In other words, the circuitry of the switching element 13 and smoothing circuit 14 may be modified to a boost or buck-boost type.

[Second Modification]

In the embodiment described above, the switching regulator 11 is of a non-isolated type. Alternatively, the switching regulator 11 may be of an isolated type.

[Third Modification]

In the embodiment described above, the switching regulator 11 is of a constant-current type. Alternatively, the switching regulator 11 may be of a constant-voltage type. In this case, the output voltage Vout from a constant-voltage switching regulator 11 is fed back to the controller 12. In response, the controller 12 generates a PWM signal having a duty cycle based on the fed-back output voltage Vout and a target value, and sends the PWM signal to the gate of the switching element 13. Through such an operation, the controller 12 performs constant-voltage control where the output voltage Vout is controlled to be brought close to the target value and to be maintained at it.

If the switching regulator 11 is of a constant-voltage type, it switches the level of the output voltage Vout to a level corresponding to the output-level signal A in synchronization with the closing of the circuit of the first light-emitting element 10*a* (at the beginning of the emission period PA). Similarly, the level of the output voltage Vout is switched to a level corresponding to the output-level signal B in synchronization with the closing of the circuit of the second light-emitting element 10*b* (at the beginning of the emission period PB).

If the light-emitting elements 10*a* and 10*b* are light-emitting diodes or organic EL elements, it is preferred that the switching regulator 11 is of a constant-current type. If loads other than the light-emitting elements 10*a* and 10*b* are to be driven by the driving device 2, a constant-current or constant-voltage switching regulator 11 is selected depending on the load characteristics and/or the control system.

[Fourth Modification]

Figure 4:
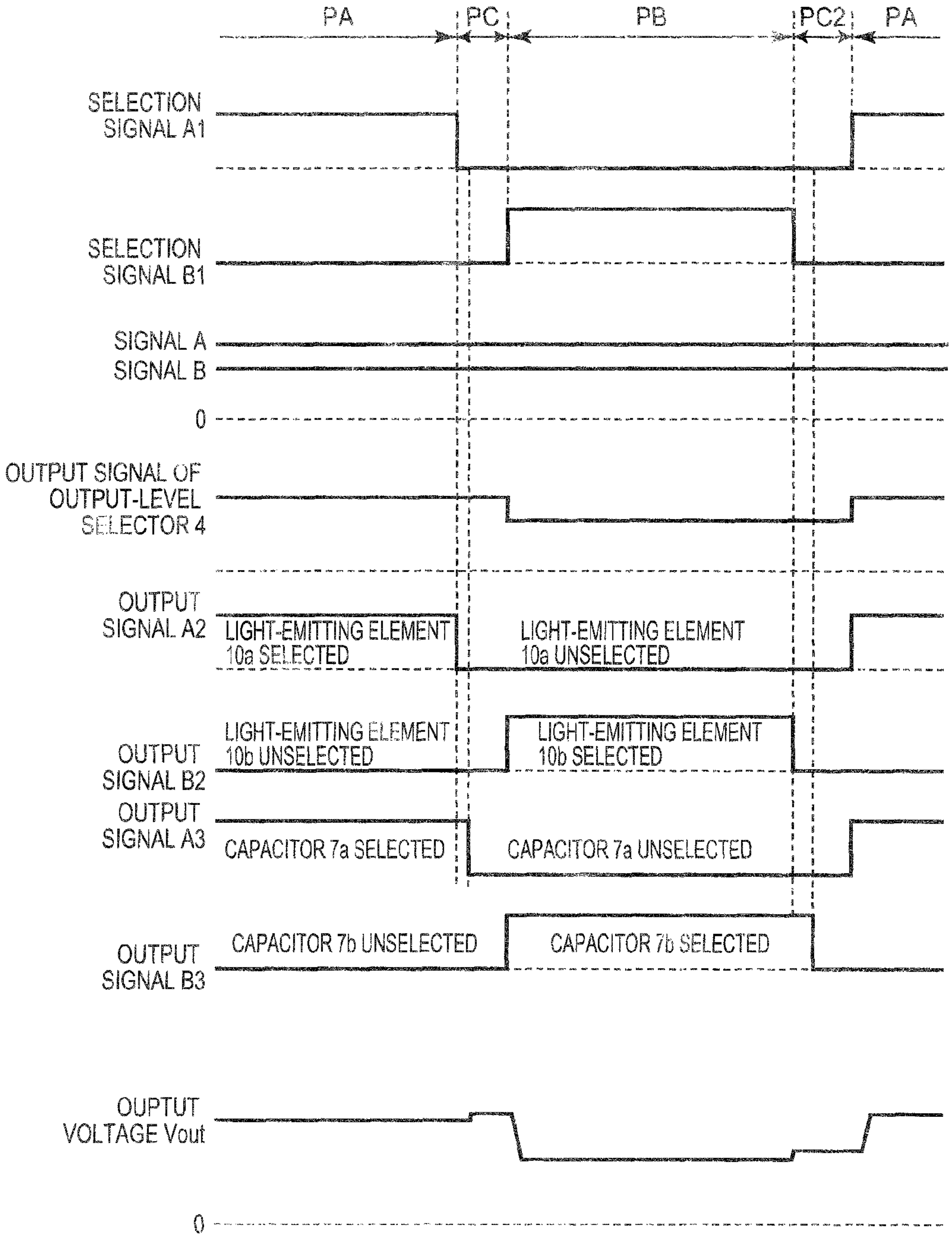
FIG. 4 is a timing chart illustrating signal waveforms of the individual components in a sequential color light-emitting device according to a modification.

As illustrated, in FIG. 4, the rising edge of the selection signal A1 may be delayed from the falling edge of the selection signal B1, and a light-out period PC2 may be present between the emission period PB and the subsequent emission period PA. In such a case, the load selector 8 sends the output signal A2 in synchronization with the selection signal A1 to the gate of the semiconductor switching element 9*a* while sending the output signal B2 in synchronization with the selection signal B1 to the gate of the semiconductor switching element 9*b*. This operation opens the circuit of the second light-emitting element 10*b* during the emission period PA during which the circuit of the first light-emitting element 10*a* is closed, opens the circuit of the first light-emitting element 10*a* during the emission period PB during which the circuit of the second light-emitting element 10*b* is closed, and opens both the circuits of the light-emitting elements 10*a* and 10*b* during the light-out periods PC and PC2.

The capacitor selector 5 synchronizes the rising edge of the output signal B3 with the rising edge of the output signal B2 from the load selector 8 while delaying the rising edge of the output signal A3 from the falling edge of the output signal B2 from the load selector 8. The capacitor selector 5 also delays the falling edge of the output signal B3 from the falling edge of the output signal B2.

This operation turns off the switch 6*b* after the semiconductor switching element 9*b* is turned off, and turns on the semiconductor switching element 9*a* after the switch 6*b* is turned off. Thus, the opening of the circuit of the second capacitor 7*b* is delayed from the opening of the circuit of the second light-emitting element 10*b*, and the closing of the circuits of the first light-emitting element 10*a* and the first capacitor 7*a* is delayed from the opening of the circuit of the second capacitor 7*b*.

The switching regulator 11 stops the on/off operation of the switching element 13 in synchronization with the opening of the circuit of the second light-emitting element 10*b* at the end of the emission period PB (i.e., at the beginning of the light-out period PC2). And, the switching regulator 11 starts the on/off operation of the switching element 13 in synchronization with the closing of the circuit of the first light-emitting element 10*a* at the beginning of the emission period PA (i.e., at the end of the light-out period PC2).

Similarly to the embodiment described above, the opening of the circuit of the first capacitor 7*a* is delayed from the opening of the circuit of the first light-emitting element 10*a*. Also similarly to the embodiment described above, the closing of the circuits of the second light-emitting element 10*b* and the second capacitor 7*b* is delayed from the opening of the circuit of the first capacitor 7*a*. Also similarly to the embodiment described above, the closing of the circuit of the second light-emitting element 10*b* is in synchronization with the closing of the circuit of the second capacitor 7*b* at the beginning of the emission period PB.

The descriptions of the first embodiment and the modifications thereof show a case of a switching regulator serving as a power source. The present invention should however not be limited to such a case and may be applied to a power conversion source that accumulates excess energy in a no-load state.

[Second Embodiment]

Figure 5:
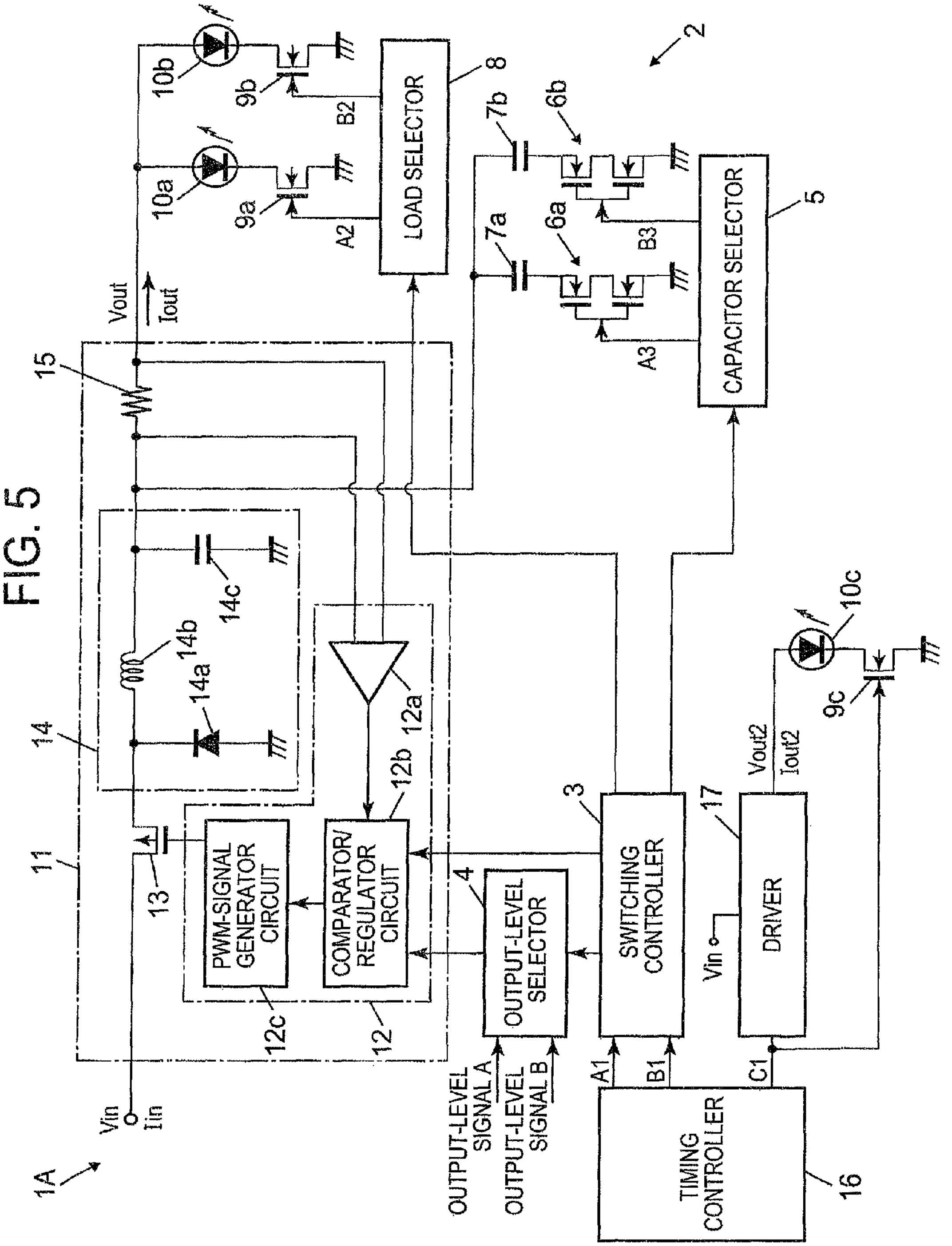
FIG. 5 is a circuit diagram of a sequential color light-emitting device according to a second embodiment.

FIG. 5 is a circuit diagram of a sequential color light-emitting device 1A. The sequential color light-emitting device 1A includes a timing controller 16, a driver 17, a third light-emitting element 10*c*, and a semiconductor switching element 9*c*, in addition to all the components included in the sequential color light-emitting device 1 according to the first embodiment.

The third light-emitting element 10*c* may be a light-emitting diode, an organic EL element, a semiconductor laser element, or another semiconductor light-emitting element. The color of the light emitted from the third light-emitting element 10*c* is different from the colors of the light emitted from the first light-emitting element 10*a* and the second light-emitting element 10*b*. The wavelength band of the light emitted from the third light-emitting element 10*c* is not limited to the visible light range. For example, the third light-emitting element 10*c* emits blue light or UV light.

The semiconductor switching element 9*c* opens/closes the circuit of the third light-emitting element 10*c*. The semiconductor switching element 9*c* is an N-channel field-effect transistor. The drain of the semiconductor switching element 9*c* is connected to the cathode of the third light-emitting element 10*c* while the source is grounded.

The timing controller 16 generates selection signals A1 and B1 and sends the selection signals A1 and B1 to the switching controller 3. The waveforms of the selection signals A1 and B1 are illustrated in FIGS. 2 and 4.

The timing controller 16 generates a selection signal C1, and sends the selection signal C1 to the driver 17 and the gate of the semiconductor switching element 9*c*. The selection signal C1 is at an OFF level during emission periods PA and PB during which either the selection signal A1 or B1 is at an ON level, and the selection signal C1 is at an ON level during light-out periods PC and PC2 during which the selection signals A1 and B1 are both at an OFF level. Thus, the semiconductor switching element 9*c* is in an ON state and the circuit of the third light-emitting element 10*c* is closed during the light-out period PC illustrated in FIG. 2 and the light-out periods PC and PC2 illustrated in FIG. 4. On the other hand, during the emission periods PA and PB, the semiconductor switching element 9*c* is in an OFF state and the circuit of the third light-emitting element 10*c* is open.

The driver 17 operates while the input selection signal C1 is at an ON level and stops while the selection signal C1 is at an OFF level. The output of the driver 17 is connected to the anode of the third light-emitting element 10*c*.

The driver 17 is a switching power source (switching regulator or DC-DC converter). During the operating period of the driver 17 (i.e., light-out periods PC and PC2), the driver 17 converts the DC input voltage Vin to a DC output voltage Vout2 through an on/off operation of a built-in switching element, and supplies the output voltage Vout2 and the output current Iout2 to the third light-emitting element 10*c*. Hence, the third light-emitting element 10*c* emits light during the light-out periods PC and PC2.

During the period when the driver 17 is not operating (i.e., during emission periods PA and PB), the output voltage Vout2 and the output current Iout2 are zero, and the semiconductor switching element 9*c* is in an OFF state. Hence, the third light-emitting element 10*c* is turned off during the emission periods PA and PB.

Thus, the third light-emitting element 10*c* flashes. The light-out periods PC and PC2 are the light emission periods for the third light-emitting element 10*c* while the emission periods PA and PB are the light-out periods for the third light-emitting element 10*c*.

Figure 6:
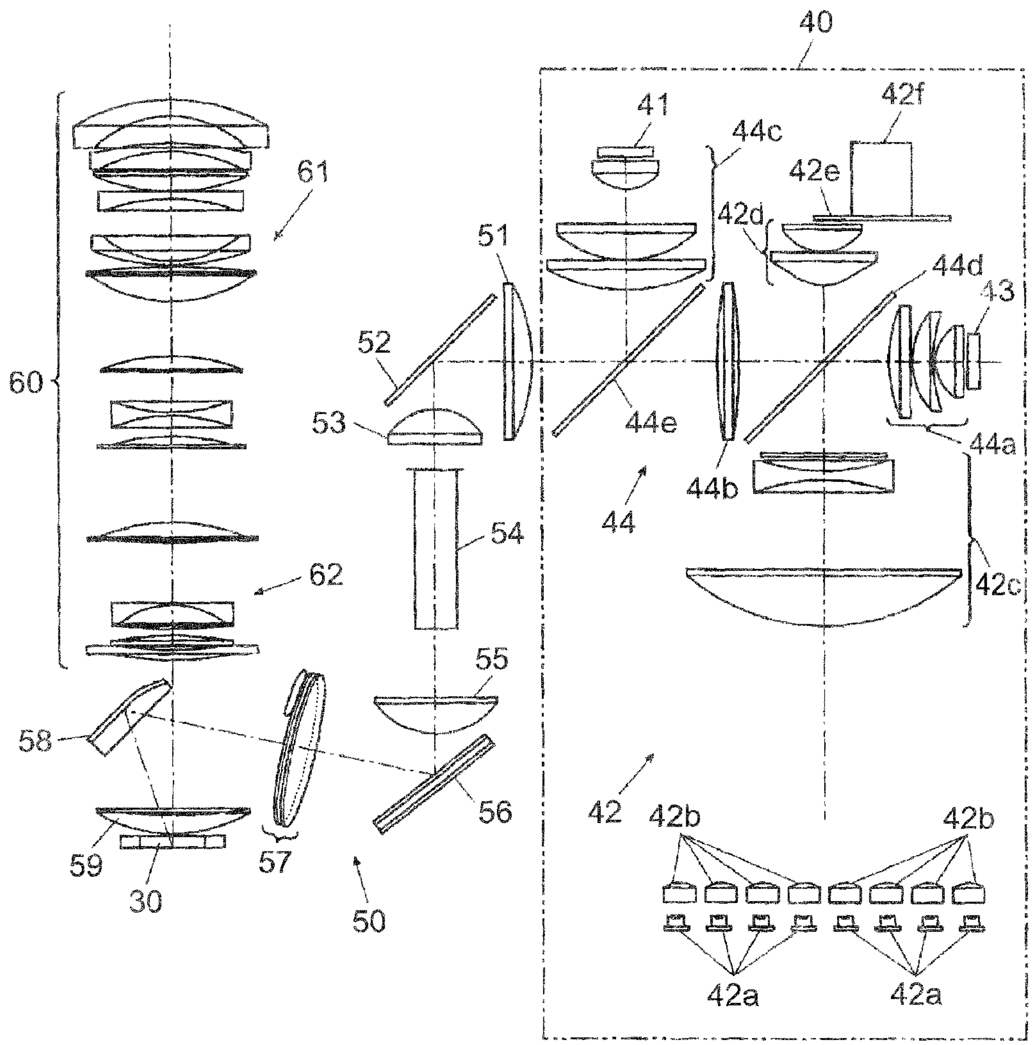
FIG. 6 is a plan view of an optical unit of a projector.

A projector including the sequential color light-emitting device 1A illustrated in FIG. 5 will now be described with reference to FIG. 6. FIG. 6 is a plan view of an optical unit of the projector. The length of one frame of an image projected by the projector is equal to the sum of the lengths of the emission periods PA and PB and the light-out period PC, which are shown in FIG. 2, or the sum of the lengths of the emission periods PA and PB and the light-out periods PC and PC2, which are shown in FIG. 4.

As illustrated in FIG. 6, the projector includes a display element 30, a time-division light generator 40, a light-source optical system 50 and a projection optical system 60.

The time-division light generator 40 emits red, green and blue light on a time division basis. The time-division light generator 40 includes a first light source 41, a light source unit 42, a second light source 43 and an optical system 44.

The light source unit 42 generates green light. Specifically, the light source unit 42 generates excitation light and converts the excitation light to green light. The light source unit 42 includes a plurality of excitation light sources 42*a*, a plurality of collimator lenses 42*b*, a lens group 42*c*, a lens group 42*d*, a fluorescent wheel 42*e* and a spindle motor 42*f*.

The excitation light sources 42*a* are two-dimensionally arrayed. The excitation light sources 42*a* are laser diodes emitting excitation laser light. The wavelength band of the excitation laser light emitted from the excitation light sources 42*a* is the blue light band or the ultraviolet light band but is not limited thereto. The third light-emitting element 10*c*, which is illustrated in FIG. 5, is equivalent to the excitation light sources 42*a*, which are flashed by the driver 17.

The collimator lenses 42*b* are arranged opposite to the respective excitation light sources 42*a*. The excitation laser light emitted from the excitation light sources 42*a* are collimated by the collimator lenses 42*b*. The lens groups 42*c* and 42*d* are disposed coaxially. The lens groups 42*c* and 42*d* condense the excitation laser light beams collimated by the collimator lenses 42*h*.

The fluorescent wheel 42*e* is arranged opposite to the surface on which the two-dimensional array of the excitation light sources 42*a* is disposed. The lens groups 42*c* and 42*d* are disposed between the fluorescent wheel 42*e* and the excitation light sources 42*a* such that the optical axes of the lens groups 42*c* and 42*d* orthogonally intersect the fluorescent wheel 42*e*. The excitation laser light condensed by the lens groups 42*c* and 42*d* is incident on the fluorescent wheel 42*e*. The fluorescent wheel 42*e* includes a green fluorescent body to emit green light by being excited by the excitation laser light, and converts the excitation laser light to green light. The fluorescent wheel 42*e* is connected to the spindle motor 42*f* such that the fluorescent wheel 42*e* is rotated by the spindle motor 42*f*.

The first light source 41 is a red light-emitting diode that generates red light. The second light source 43 is a blue light-emitting diode that generates blue light. The first light-emitting element 10*a* illustrated in FIG. 5 is equivalent to the first light source 41; the second light-emitting element 10*b* is equivalent to the second light source 43; and the light sources 41, 42 are flashed by the driving device 2.

The first light source 41 is disposed such that the optical axis of the first light source 41 is parallel to the optical axes of the lens groups 42*c*, 42*d*. The second light source 43 is disposed such that the optical axis of the second light source 43 is orthogonal to the optical axes of the lens groups 42*c*, 42*d* and the optical axis of the first light source 41.

The optical system 44 aligns the optical axes of the first light, source 41, the light source unit 42, and the second light source 43 to emit the red, green, and blue light, respectively. The optical system 44 includes a lens group 44*a*, a lens 44*b*, a lens group 44*c*, a first dichroic mirror 44*d* and a second dichroic mirror 44*e*.

The lens group 44*a* faces the second light source 43. The lens group 44*a* and the lens 44*b* are disposed with their optical axes aligned. The lens group 44*a* and the lens 44*b* are disposed such that their optical axes are orthogonal to the optical axes of the lens group 42*c* and the lens group 42*d* between the lens group 42*c* and the lens group 42*d*.

The first dichroic mirror 44*d* is disposed between the lens group 44*a* and the lens 44*b*, and between the lens groups 42*c* and 42*d*. The first dichroic mirror 44*d* intersects the optical axes of the lens groups 42*c* and 42*d* at an angle of 45 degrees, and intersects the optical axes of the lens group 44*a* and the lens 44*b* at an angle of 45 degrees. The first dichroic mirror 44*d* transmits excitation light within the wavelength band of the light, which is emitted from the excitation light sources 42*a* (for example, blue excitation light), toward the fluorescent wheel 42*e*; and transmits light within the blue wavelength band, which is emitted from the second light source 43, toward the second dichroic mirror 44*e*. The first dichroic mirror 44*d* reflects light within the green wavelength band, which is emitted from the fluorescent wheel 42*e*, toward the second dichroic mirror 44*e*.

The lens group 44*c* faces the first light source 41. The lens group 44*c* is disposed such that the optical axis of the lens group 44*c* orthogonally intersects the optical axes of the lens group 44*a* and the lens 44*b* on the opposite side of the second light source 43 and the first dichroic mirror 44*d* with respect to the lens 44*b*.

The second dichroic mirror 44*e* is disposed on the opposite side of the first light source 41 with respect to the lens group 44*c*, and disposed on the opposite side of the first dichroic mirror 44*d* with respect to the lens 44*b*. The second dichroic mirror 44*e* intersects the optical axis of the lens group 44*c* at a 45-degree angle, and intersects the optical axes of the lens group 44*a* and the lens 44*b* at a 45-degree angle. The second dichroic mirror 44*e* transmits the light within the blue and green wavelength bands, which comes from the first dichroic mirror 44*d*, toward the light-source optical system 50; and reflects the light within the red wavelength band, which is emitted from the first light source 41, toward the light-source optical system 50.

The structure of the time-division light generator 40 is not limited to the above-described structure, but any structure may be employed as long as the time-division light generator 40 emits red, green and blue light on a time division basis.

The light-source optical system 50 projects the red, green and blue light from the time-division light generator 40 onto the display element 30. The light-source optical system 50 includes a lens 51, a reflecting mirror 52, a lens 53, a light-guiding unit 54, a third lens 55, an optical-axis converting mirror 56, a light condensing lens group 57, an irradiation mirror 58 and an irradiation lens 59.

The lens 51 is disposed on the opposite side of the lens 44*b* with respect to the second dichroic mirror 44*e*. The lens 51 is disposed such that the optical axis of the lens 51 coincides with the optical axes of the lens 44*b* and the lens group 44*a*.

The lens 53, the light-guiding unit 54 and the lens 55 are disposed such that their optical axes align with each other. The optical axes of the lens 53, the light-guiding unit 54 and the lens 55 are orthogonal to the optical axes of the lens 51, the lens 44*b* and the lens group 44*a*.

The reflecting mirror 52 is disposed at the intersection of the optical axes of the lens 53 and the lens 51. The reflecting mirror 52 intersects the optical axes of the lenses 51, 44*b* and the lens group 44*a* at a 45-degree angle, and intersects the optical axes of the lens 53, the light-guiding unit 54 and the lens 55 at a 45-degree angle. The red, green and blue light, generated by the time-division light generator 40 is condensed through the lenses 51 and 53, and is reflected at the reflecting mirror 52 toward the light-guiding unit 54.

The light-guiding unit 54 is a light tunnel or a light rod. The light-guiding unit 54 reflects or totally reflects multiple times the red, green and blue light emitted from the time-division light generator 40 at a side surface of the light-guiding unit 54. This allows the red, green and blue light to be a beam having a uniform intensity distribution. The lens 55 projects the red, green and blue light, which is guided through the light-guiding unit 54, toward the optical-axis converting mirror 56 and condenses the red, green and blue light. The optical-axis converting mirror 56 reflects the red, green and blue light, which is projected by the lens 55, toward the light condensing lens group 57. The light condensing lens group 57 projects the red, green and blue light, which is reflected at the optical-axis converting mirror 56, toward the irradiation mirror 58 and condenses the red, green and blue light. The irradiation mirror 58 reflects the light, which is projected by the light condensing lens group 57, toward the display element 30. The irradiation lens 59 projects the light, which is reflected at the irradiation mirror 58, onto the display element 30.

The display element 30 is a spatial light modulator and forms an image by modulating the red, green and blue light emitted from the light-source optical system 50 for every pixel (spatial light modulation element). Specifically, the display element 30 is a digital micromirror device (DMD) including two-dimensionally-arrayed movable micromirrors. The movable micromirrors correspond to the spatial light modulation elements as pixels. The display element 30 is driven by a driver. That is, when red light is emitted to the display element 30, the ratio of time (duty cycle) during which the red light is reflected toward the later-described projection optical system 60 is controlled for each movable micromirror by controlling each movable micromirror of the display element 30 (PWM control, for example). Thus, a red image is formed by the display element 30. The same applies to the case where green light or blue light is emitted to the display element 30.

The display element 30 may be a transmissive spatial light modulator (such as a panel having liquid crystal shutter array, i.e., so-called liquid crystal display), instead of a reflective spatial light modulator. In the case where the display element 30 is a transmissive spatial light modulator, the optical design of the light-source optical system 50 is changed such that the optical axis of the red, green and blue light emitted by the light-source optical system 50 coincides with the optical axis of the later-described projection optical system 60, and the display element 30 is disposed between the projection optical system 60 and the light-source optical system 50.

The projection optical system 60 faces the display element 30, with the optical axis of the projection optical system 60 extending in the front-back direction to intersect the display element 30 (specifically, the optical axis of the projection optical system 60 orthogonally intersects the display element 30). The projection optical system 60 projects forward the light reflected by the display element 30 to project an image formed by the display element 30 onto a screen. The projection optical system 60 includes a movable lens group 61 and a fixed lens group 62. The projection optical system 60 can change the focal length and can perform focusing by moving the movable lens group 61.

The optical system of the projector shown in FIG. 6 may be applied to a rear-projection display.

In this second embodiment, the lighting periods of the first light-emitting element 10*a*, the second light-emitting element 10*b* and the third light-emitting element 10*c* do not overlap with one another. Alternatively, the third light-emitting element 10*c* may be turned on simultaneously with the first light-emitting element 10*a* or the second light-emitting element 10*b*.

The brightness can be improved by providing a mixed-color period during which two light-emitting elements of different colors are turned on.

In the embodiments described above, the switching element 13 is a P-channel field-effect transistor, the semiconductor switching elements 9*a*, 9*b* and 9*c* are N-channel field-effect transistors, and the switches 6*a* and 6*b* are N-channel field-effect transistors. Alternatively, the N-channel and the P-channel of these transistors can be reversed. In such a case, the logics at the gate signals and the connections at the drains, sources should be reversed appropriately.

The present invention is not limited to the embodiments described above, and the claims and other equivalents thereof are included in the scope of the invention.

The entire disclosure of Japanese Patent Application No. 2012-055371 filed on Mar. 13, 2012 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A driving device to drive a first load and a second load, the driving device comprising:

a power source that converts input power to output power, an output of the power source being connected to the first load and the second load;

a first capacitor connected to the output of the power source;

a second capacitor connected to the output of the power source;

a load selector that opens and closes a circuit of the first load and a circuit of the second load so as to alternately close the circuit of the first load and the circuit of the second load such that the load selector closes the circuit of the second load after the opening of the circuit of the first load; and a capacitor selector that opens and closes a circuit of the first capacitor and a circuit of the second capacitor so as to alternately close the circuit of the first capacitor and the circuit of the second capacitor such that the capacitor selector closes the circuit of the first capacitor in synchronization with the closing of the circuit of the first load by the load selector, and such that the capacitor selector closes the circuit of the second capacitor in synchronization with the closing of the circuit of the second load by the load selector, wherein the capacitor selector opens the circuit of the first capacitor after the opening of the circuit of the first load by the load selector and before a next closing of the circuit of the first load by the load selector.

2. The driving device according to claim 1, wherein the load selector closes the circuit of the second load after the opening of the circuit of the first capacitor by the capacitor selector.

3. The driving device according to claim 1, wherein the power source changes an output voltage or an output current in synchronization with the closing of the circuit of the first load, and changes the output voltage or the output current in synchronization with the closing of the circuit of the second load.

4. The driving device according to claim 3, wherein the power source changes the output voltage or the output current based on a load current or a load voltage of the first load and the second load.

5. The driving device according to claim 1, wherein the power source comprises a switching regulator that includes a switching element and that converts an input voltage to an output voltage in response to an on/off operation of the switching element.

6. The driving device according to claim 5, wherein the capacitor selector opens the circuit of the first capacitor after a lapse of a predetermined period of time or longer from the opening of the circuit of the first load, the predetermined period of time being an on/off cycle of the switching element.

7. The driving device according to claim 5, wherein the switching regulator stops the on/off operation of the switching element in synchronization with the opening of the circuit of the first load, and starts the on/off operation of the switching element in synchronization with the closing of the circuit of the second load.

8. A light-emitting device comprising:

a power source that converts input power to output power;

a first capacitor connected to an output of the power source;

a second capacitor connected to the output of the power source;

a first light-emitting element connected to the output of the power source;

a second light-emitting element connected to the output of the power source;

a light-emitting-element selector that opens and closes a circuit of the first light-emitting element and a circuit of the second light-emitting element so as to alternately open the circuit of the first light-emitting element and the circuit of the second light-emitting element such that the light-emitting-element selector opens the circuit of the second light-emitting element after the closing of the circuit of the first light-emitting element; and a capacitor selector that opens and closes a circuit of the first capacitor and a circuit of the second capacitor so as to alternately close the circuit of the first capacitor and the circuit of the second capacitor such that the capacitor selector closes the circuit of the first capacitor in synchronization with the closing of the circuit of the first light-emitting element by the light-emitting-element selector, and such that the capacitor selector closes the circuit of the second capacitor in synchronization with the closing of the circuit of the second light-emitting element by the light-emitting-element selector, wherein the capacitor selector opens the circuit of the first capacitor after the opening of the circuit of the first light-emitting element by the light-emitting-element selector and before a next closing of the circuit of the first light-emitting element by the light-emitting-element selector.

9. The light-emitting device according to claim 8, wherein the light-emitting-element selector closes the circuit of the second light-emitting element after the opening of the circuit of the first capacitor by the capacitor selector.

10. The light-emitting device according to claim 8, wherein the power source changes an output voltage or an output current in synchronization with the closing of the circuit of the first light-emitting element, and changes the output voltage or the output current in synchronization with the closing of the circuit of the second light-emitting element.

11. The light-emitting device according to claim 10, wherein the power source changes the output voltage or the output current based on a load current or a load voltage of the first light-emitting element and the second light-emitting element.

12. The light-emitting device according to claim 8, wherein the power source comprises a switching regulator that includes a switching element and that converts an input voltage to an output voltage in response to an on/off operation of the switching element.

13. The light-emitting device according to claim 12, wherein the capacitor selector opens the circuit of the first capacitor after a lapse of a predetermined period of time or longer from the opening of the circuit of the first light-emitting element, the predetermined period of time being an on/off cycle of the switching element.

14. The light-emitting device according to claim 12, wherein the switching regulator stops the on/off operation of the switching element in synchronization with the opening of the circuit of the first light-emitting element, and starts the on/off operation of the switching element in synchronization with the closing of the circuit of the second light-emitting element.

15. The light-emitting device according to claim 8, further comprising:

a third light-emitting element; and a driver that causes the third light-emitting element to emit light during a period from the opening of the circuit of the first light-emitting element to the closing of the circuit of the second light-emitting element.

16. A projector comprising:

a light-emitting device, wherein the light-emitting device comprises:

a power source that converts input power to output power;

a first capacitor connected to an output of the power source;

a second capacitor connected to the output of the power source;

a first light-emitting element connected to the output of the power source;

a second light-emitting element connected to the output of the power source;

a light-emitting-element selector that opens and closes a circuit of the first light-emitting element and a circuit of the second light-emitting element so as to alternately open the circuit of the first light-emitting element and the circuit of the second light-emitting element such that the light-emitting-element selector opens the circuit of the second light-emitting element after the closing of the circuit of the first light-emitting element; and a capacitor selector that opens and closes a circuit of the first capacitor and a circuit of the second capacitor so as to alternately close the circuit of the first capacitor and the circuit of the second capacitor such that the capacitor selector closes the circuit of the first capacitor in synchronization with the closing of the circuit of the first light-emitting element by the light-emitting-element selector, and such that the capacitor selector closes the circuit of the second capacitor in synchronization with the closing of the circuit of the second light-emitting element by the light-emitting-element selector, wherein the capacitor selector opens the circuit of the first capacitor after the opening of the circuit of the first light-emitting element by the light-emitting-element selector and before a next closing of the circuit of the first light-emitting element by the light-emitting-element selector.

* * * * *